Patented Nov. 5, 1946

2,410,661

UNITED STATES PATENT OFFICE 2,410,661

ART OF PROCESSED NATURAL RUBBER

Walter F. Huppke, New York, N. Y., assignor to West Disinfecting Company, Long Island City, N. Y., a corporation of New York No Drawing. Application November 22, 1944, Serial No. 564,729

11 Claims. (Cl. 260—769)

The present invention is concerned with the processing of natural rubber and the resultant flexible product.

Natural rubber as such has but little commercial utility due to its tendency to undergo objectionable transformations by absorbing oxygen from the air, also under the action of the actinic rays of the sun.

For the great bulk of useful applications, that is, for purposes other than completely vulcanized hard rubber, the conventional curing or vulcanization is carried on to such extent as to saturate but a fraction of the large number of unsaturated double bonds in the molecular structure of natural rubber, the controlled extent of saturation determining the elastic or other characteristics desired. Due to the tendency of oxygen to attach at the residual unsaturated bonds, the tendency to the objectionable transformation inhering in natural rubber still exists in such cured rubber, though to lesser degree, and this accounts for the deterioration of even such cured rubber with time.

Where it is attempted to allay this difficulty by hydrogenating natural rubber prior to vulcanization thereof, in an effort to satisfy the residual double bonds otherwise left unaffected, the drastic conditions to which the rubber is subjected in such hydrogenation tends to disruption of the rubber molecule.

It is accordingly among the objects of the invention to provide a practical and efficient process for treating natural rubber so as to saturate its double bonds to predetermined extent, and without danger of disruption of the rubber molecule, in order to impart to the rubber when subsequently vulcanized greatly enhanced resistance to oxidation as compared with natural rubber processed in conventional fashion, and all without impairing the characteristics of the rubber from the standpoint of wear, elasticity, electrical insulation, and other familiar properties thereof.

The invention is carried out by alkylation of the natural rubber to the controlled degree desired; that is, rubber which is to be subsequently cured but slightly will be first subjected to a more extended alkylation treatment than ruber that is to have more extensive curing.

Due to the fact that the alkylated product obtained by the present process contains less unsaturated double bonds than natural rubber, it requires less sulphur or other compounding ingredients to effeect the desired cure or stability in the manufactured articles. The extent to which the natural rubber is saturated by alkylation may be controlled so that a predetermined amount of vulcanizing ingredients would be added to control exactly the properties of the final and completely saturated product.

The alkylation of natural rubber presents serious problems, for alkylation being a reaction characteristically exothermic, once the reaction has started the evolution of heat in the process promotes degeneration of the rubber and thus tends to defeat the purpose of the alkylation. The natural rubber molecule being very complex, with an approximate molecular weight of 100,000 to 180,000, splits and decomposes readily, especially as a result of pyrolysis, to yield various physical and chemical compounds, many of which have little mechanical strength and are permanently sticky. Moreover, even fairly dilute solutions of rubber may be of viscosity so high as to interfere with the starting of the desired alkylation reaction and to give rise instead to certain deleterious side reactions.

According to the present invention, the natural rubber, preferably crepe rubber, is dissolved by stirring at room temperature, into a saturated aliphatic liquid hydrocarbon solvent, to give a dilute solution in which the rubber content is not more than one to two per cent by weight of the solvent. Such low concentration of solution is especially desirable to assure sufficient fluidity thereof for effective action of the catalyst which is added after the rubber has been dissolved, and to reduce side reactions to a minimum. During the alkylation the mix is constantly stirred for ten to sixty minutes, preferably by an agitating blade or by bubbling gas therethrough for contact between the rubber solution and the catalyst, or if desired the entire mass may be passed through a device such as a homogenizer or colloid mill. The progress of the alkylation can be readily checked by determining the iodine number as a measure of the degree of unsaturation attained. The heat evolved by the exothermic reaction as the alkylation proceeds is removed, as for instance, by a cooling jacket about the reaction vessel, in order to keep the reaction temperature below 100° F. and preferably between 30 and 50° F.

Desirably, a lower saturated aliphatic hydrocarbon is used as the rubber solvent and alkylating agent and one that presents at least one tertiary carbon is preferred, since it renders the compound more highly reactive. Either isobutane or isopentane may be used most advantageously because they have low boiling points and are therefore readily driven off at low temperature without injury to the rubber product. Moreover, each of these compounds has the further advantage that it need not be used in chemically pure form, because even substantial proportions of normal isomers therein, as high as 20 to 30 per cent, will be harmless to act merely as diluent by failing to react with the rubber.

A preferred catalyst is sulphuric acid which should preferably be used in concentrated form, that is, in 95 to 98 per cent solution. It is important in the use of this catalyst to keep the reacting mass from rising unduly in temperature, otherwise decomposition of the acid will result in excessive oxidation. At relatively high temperature, moreover, considerable carbonization or fouling would occur with inefficient utilization of the acid and other serious objections.

The acid is used in an amount by volume preferably between 50 and 100 per cent that of the solvent. The reaction vessel is preferably jacketed for cooling liquid or provided with cooling or refrigerating pipes to carry off the heat of reaction and keep the temperature as above noted, well below 100° F. and preferably between 30 and 50° F.

After the alkylation has been completed, the acid catalyst is allowed to separate from the reaction product in a settling tank. The reaction product is then subjected to heat, preferably under vacuum to drive off such solvent as has not been chemically combined in the reaction. Due to the relatively low specific heat and low latent heat of vaporization of the saturated, aliphatic hydrocarbons used, they evaporate readily from the reacted mass. The unreacted residue passes off under vacuum with particular facility and at low temperature, substantially regardless of the solvent and alkylating agent used within the scope of the invention, so that the alkylated product is not in the least impaired. The solvent is readily condensed for re-use in the cycle.

The sulphuric acid may be rendered more active and efficacious as a catalyst by addition thereto of a small proportion, preferably two to five per cent by weight relative to the acid, of hydrogen halide, such as hydrogen chloride or hydrogen bromide.

One specific practical embodiment of the process above described is as follows:

1000 kilograms of Burma crepe rubber is dissolved in 50,000 kilograms of isobutane by agitation in a pressure vessel at room temperature. The solution, together with an equal volume of 96% sulphuric acid containing 3% of hydrogen bromide in solution therein, is metered into a high speed mixing device and thence into a tube coil held at 50° F. at such rate that the time of exposure in the coil is 12 minutes. The mixture is then run into a settling tank where the sulphuric acid is removed. The isobutane is removed by vacuum distillation and the residual processed rubber is washed with water and dried.

While the original natural rubber had an iodine number of 122, the final product treated as above, had an iodine number of 32. Thus, by the present procedure, the natural rubber is saturated to extent slightly under 75 per cent. The degree of saturation can be accurately controlled by variation, for instance, of the time of exposure in the coil.

When the product above described was thereupon cured or vulcanized by conventional methods to complete the saturation, that is to saturate the approximately 25% of remaining unsaturated bonds, it had substantially the same physical properties, such as elasticity and the like as corresponding stock containing natural rubber and correspondingly cured or vulcanized to corresponding extent of about 25%, but as above noted, the product has greatly enhanced life under atmospheric conditions.

The sulphuric acid taken from the settling tank may have been somewhat weakened in the alkylation, as a result of minor side reactions, but it may be brought back to original strength by addition thereto of appropriate proportions of fuming sulphuric acid or anhydride thereof prior to recycling.

While the sulphuric acid catalyst is generally preferred, other catalysts are suitable for the purpose such as anhydrous aluminum chloride, chlorsulfonic acid and fluorsulfonic acid.

In one embodiment, boron trifluoride, a gas at room temperature is used as the catalyst, by introducing the same into the rubber solution in the presence of a catalyst such as precipitated nickel. For 1,000 parts by weight of the solvent or alkylating agent, say of isopentane, 10 parts of the boron trifluoride, 10 parts of the precipitated nickel catalyst and two parts of water are desirably used. The process is carried on in manner similar to the foregoing description.

The alkylated rubber product of the present invention lends itself to admixture with carbon or other filler or modifiers in much the same way as ordinary rubber and it can be handled in every way like natural rubber. After compounding, its wear, elasticity and electric insulating properties are comparable to those of ordinary rubber, but it has the great advantage over the latter of remaining substantially unaffected by oxygen and even by halogen gas.

The alkylated but uncured product being partly saturated is to that extent more resistant to oxidation than is the natural unprocessed rubber, and such alkylated uncured product is more resistant to oxidation than is rubber that has been lightly cured according to conventional methods.

As many changes could be made in the above process and product and many apparently widely different embodiments of this invention could be made without departing from the scope of the claims, it is intended that all matter contained in the above description shall be interpreted as illustrative and not in a limiting sense.

Having thus described my invention, what I claim as new and desire to secure by Letters Patent of the United States is:

1. The process of treating natural rubber which consists in dissolving the same in lower saturated aliphatic hydrocarbon selected from the group consisting of isobutane and isopentane in the presence of alkylating catalyst of the type that promotes the saturation of the double bonds of such rubber and at a temperature above about 30° F. and well below 100° F.

2. The process of treating natural rubber which consists in dissolving one to two (1% to 2%) per cent by weight thereof in lower saturated aliphatic hydrocarbon selected from the group consisting of isobutane and isopentane in the presence of alkylating catalyst of the type that promotes the saturation of the double bonds of such rubber and at a temperature above about 30° F. and well below 100° F.

3. The process of treating natural rubber which consists in dissolving one to two (1% to 2%) per cent by weight thereof in lower saturated aliphatic hydrocarbon selected from the group consisting of isobutane and isopentane in the presence of alkylating catalyst of the type that promotes the saturation of the double bonds of said rubber and at a temperature above about 30° F. and well below 100° F. and saturating the residual double bonds of said rubber by vulcanizing agents.

4. The process which consists in dissolving natural rubber in the presence of an alkylating catalyst of the type that promotes the saturation of the double bonds of such rubber and at a temperature above about 30° F. and well below 100° F. in 50 to 100 times the volume thereof of lower saturated liquid aliphatic hydrocarbon of the type having a tertiary carbon atom and selected from the group consisting of isobutane and isopentane, under agitation for a period of time between ten and sixty minutes, then removing the catalyst and finally evaporating the solvent.

5. The process which consists in dissolving one part by weight of natural rubber in 50 to 100 parts of solvent selected from the group consisting of isobutane and isopentane, and then treating the solution in the presence of concentrated sulphuric acid catalyst at a temperature above about 30° F. and well below 100° F. for a period of time sufficient for predetermined degree of alkylation, thereupon removing the acid catalyst and finally evaporating all the uncombined solvent, leaving the residue of alkylated rubber.

6. The process recited in claim 5, in which the heat evolved in the exothermic alkylating reaction is removed at such rate as to maintain the reaction temperature between 30 and 50 degrees F.

7. The process recited in claim 5 in which the acid catalyst is of concentration of 95 to 98 per cent and of volume between fifty and one hundred per cent that of the solvent.

8. The process recited in claim 5 in which the activity and life of the acid catalyst are prolonged by the inclusion therewith of hydrogen halide.

9. The process of alkylating natural rubber, which consists in making a dilute solution thereof in lower saturated liquid aliphatic hydrocarbon selected from the group consisting of isobutane and isopentane, introducing thereinto boron trifluoride in the presence of a small proportion of water and precipitated nickel catalyst at a temperature of less than 100° F. and separating the resultant alkylated product therefrom.

10. As a composition of matter, processed natural rubber substantially devoid of double bonds and characterized by substantially the wear, elasticity and electrical insulating characteristics of vulcanized rubber and by substantially enhanced resistance to oxidation and to halogenation, the double bonds of said rubber being partly saturated by alkyl groups of lower saturated liquid aliphatic hydrocarbon selected from the group consisting of isobutane and isopentane said alkylation being performed by substantially the process recited in claim 1 and the residual double bonds of the composition being saturated by vulcanizing agents.

11. As a composition of matter, natural rubber, partially alkylated with lower saturated aliphatic hydrocarbon selected from the group consisting of isobutane and isopentane that presents at least one tertiary carbon atom said alkylation being performed by substantially the process recited in claim 5 and characterized upon complete vulcanization thereof by substantially the wear, elasticity and electrical insulating characteristics of vulcanized rubber and by substantially enhanced resistance to oxidation and to halogenation.

WALTER F. HUPPKE.